Jan. 8, 1963  A. S. LAMBURN ETAL  3,072,339
HEATING AND VENTILATING APPARATUS FOR VEHICLES
Filed Sept. 5, 1958  2 Sheets-Sheet 1
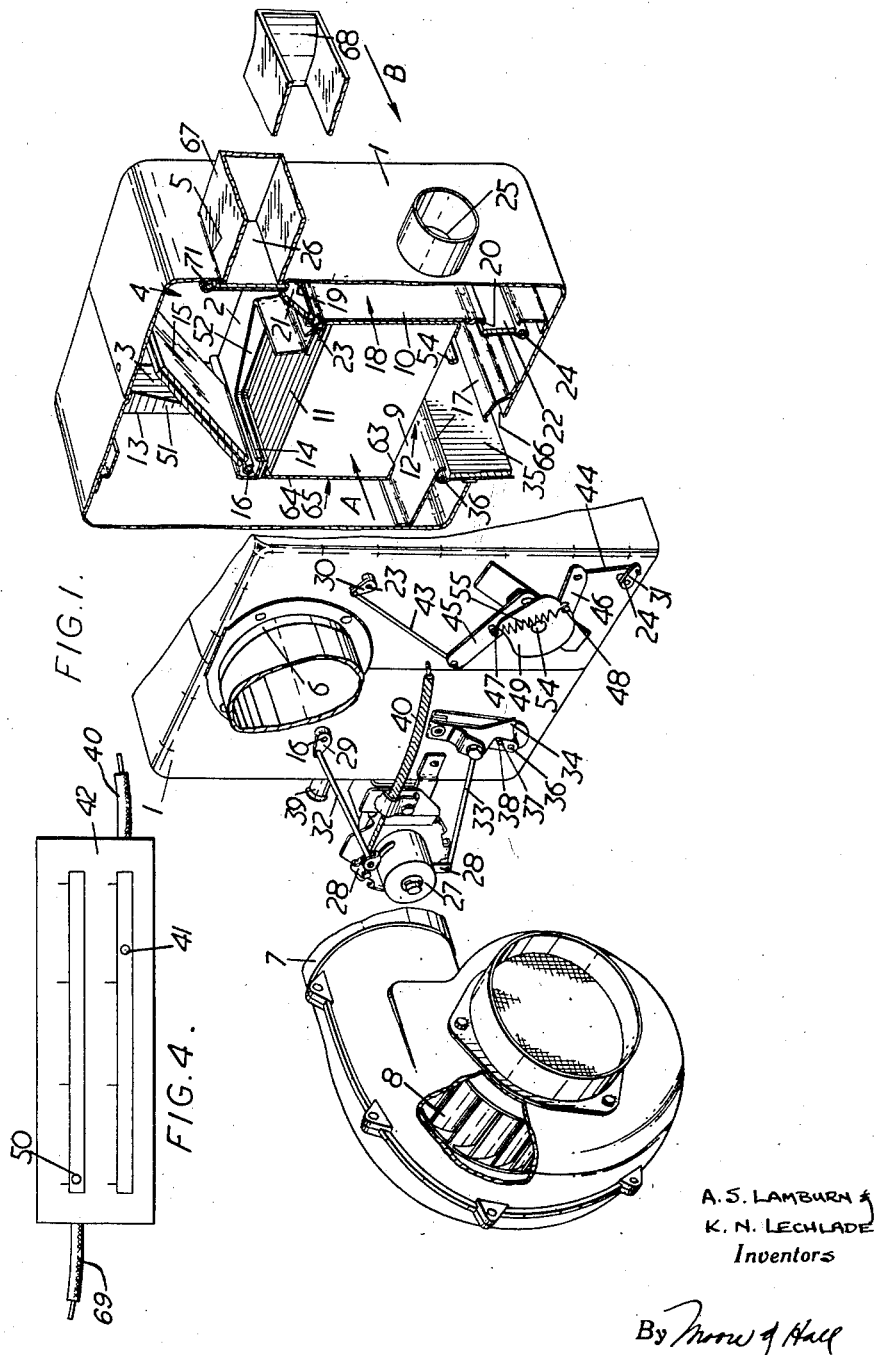
A. S. LAMBURN &
K. N. LECHLADE
Inventors
By Moore & Hall
Attorneys

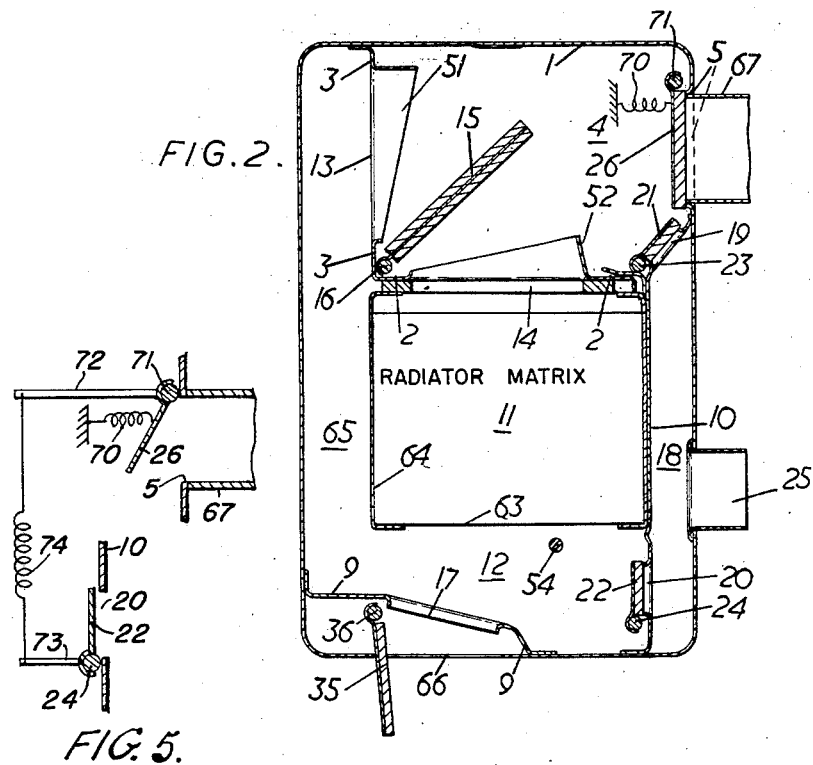
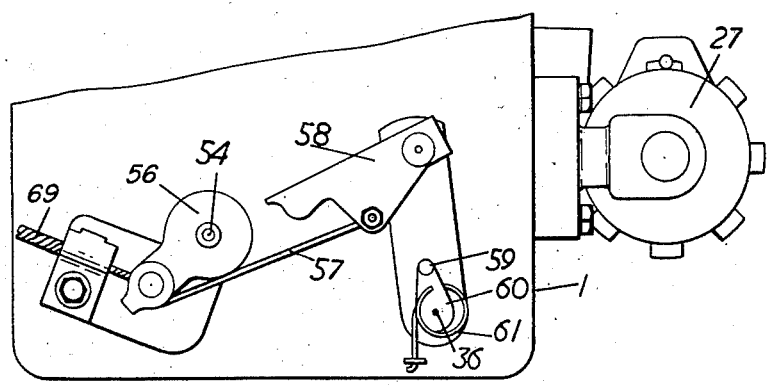

United States Patent Office 3,072,339
Patented Jan. 8, 1963

3,072,339
HEATING AND VENTILATING APPARATUS FOR VEHICLES
Alan Salisbury Lamburn, Kencott, near Lechlade, and Harold Eric William Foster, Witney, Oxon, England
Filed Sept. 5, 1958, Ser. No. 759,313
6 Claims. (Cl. 237—12.3)

The present invention relates to heating and ventilating apparatus suitable for vehicles.

It is an object of the present invention to provide heating and ventilating apparatus suitable for use in vehicles and having provision for the supply of air to first and second locations, e.g. the passenger compartment and the interior of the windshield, at different temperatures.

According to the present invention we provide heating and ventilating apparatus for vehicles comprising a housing, means to define an air inlet compartment, a main air outlet compartment, a direct connecting passage between said inlet and main outlet compartments, air heating means disposed in a further connecting passage between the inlet and main outlet compartments, a first valve to control the proportions of air flowing respectively through the direct and further connecting passages, an auxiliary air outlet compartment, second and third valves to control flow of air from the inlet compartment and the main outlet compartment respectively to the auxiliary outlet compartment, and means to operate the said second and third valves conjointly such that, over a substantial range of operation of said means, opening of one valve occurs simultaneously with the closure of the other.

Preferably air may be supplied to the air inlet compartment alternatively by a motor-driven fan or through a duct fed from a forward-facing louvre outside the vehicle. The duct is preferably associated with a non-return flap valve to prevent loss of air from the inlet compartment through the duct when the fan is driven.

The heating means may conveniently comprise a conventional radiator matrix arranged to be fed with hot coolant derived from the usual engine cooling system, the flow of coolant being preferably controlled by a suitable valve. Means to operate this valve may conveniently be linked to the first valve means, so that when any flow of air occurs over the radiator matrix a maximum flow of coolant through the matrix is permitted.

Preferably also a further valve is provided to control the flow of air from the main outlet compartment, for example to the interior of the vehicle, the further valve being linked to the second and third valves, closure of the further valve being effected when the third valve is fully open so that a maximum flow of heated air from the auxiliary outlet compartment will be produced, for example to the interior of the windshield for defrosting purposes.

A vehicle heater embodying the invention will now be described with reference to the accompanying drawings of which, FIGURE 1 shows a partially sectionalized, partially-exploded view of the heater, FIGURE 2 shows a cross-sectional view of the heater from the direction of the arrow A in FIGURE 1, FIGURE 3 shows a portion of the control mechanism as viewed from the direction of the arrow B in FIGURE 1, and FIGURE 4 shows a view of a suitable control panel for the heater.

FIGURE 5 is a schematic showing of one arrangement for controlling two of the valves by manual means.

The heater comprises a rectangular sheet-metal housing 1, whose walls are formed to provide inlet and outlet ports and whose interior is subdivided into various compartments by sheet metal partitions. Partitions indicated at 2 and 3 define a substantially rectangular air inlet compartment indicated at 4. Air may enter compartment 4 either through a port 5 formed in the outer wall of housing 1, which in use is connected via a duct 67 to a louvre 68 mounted in a forward-facing position at the exterior of the vehicle or through a port 6, likewise formed in the outer wall of housing 1, which is connected through a duct 7 to the outlet of an electrically-driven centrifugal fan 8. The inlet of fan 8 communicates with the exterior of the vehicle by means of a further duct (not shown). Further sheet metal partitions are indicated at 9 and 10. Partitions 2 and 10 support a conventional radiator matrix indicated at 11. Partitions 9 and 10, housing 1, and the bottom 63 of the matrix define a main air outlet compartment 12. Partition 3, one vertical wall 64 of the matrix, and housing 1 define a direct connecting passage 65 between the air inlet compartment 4 and the main outlet compartment 12, air entering this passage through a port 13 formed in partition 3. The air passages through matrix 11 define a further connecting passage between the inlet and outlet compartments, air entering this passage through a port 14 formed in partition 2. A flap valve 15 is mounted on a shaft 16 lying adjacent to the boundary between partitions 2 and 3, and cooperates with ports 13 and 14 to determine the proportion of air flowing from the inlet compartment to the main outlet compartment through the two connecting passages referred to. Sector shaped shrouds 51, 52 are provided around ports 13 and 14, so that the arc of movement of the valve 15 is limited to about 65°. Air from main outlet compartment 12 may pass directly to the main passenger compartment of the vehicle through a port 17 formed in partition 9, and a port 66 formed in the base of housing 1. Partition 10 and the adjacent wall of housing 1 define an auxiliary outlet compartment 18 having communication with compartment 4 through a port 19 and with compartment 12 through a port 20. Ports 19 and 20 are respectively associated with valves 21 and 22, carried on shafts 23 and 24. Air may leave the compartment 18 through a port 25 passing thence, in normal use, through ducts (not shown) to nozzles mounted adjacent to the interior surface of the vehicle windshield.

Port 5, previously mentioned, has associated with it a non return, flap valve, 26, spring biased to open position as at 70 this valve serving to permit the entry of air into compartment 4 through port 5 under ram pressure when the fan 8 is stationary but to prevent escape of air through that port when fan 8 is running. Valve 26 is closed when valve 22 is fully open by a suitable lost-motion connection between shaft 24 and shaft 71. Port 17, previously mentioned, has associated with it a flap valve 35, mounted upon a shaft 36.

FIGURE 5 shows a construction by which valve 26, which is biased to open position by spring 70, is closed when valve 22 is opened by manual member 50. Valve 26 and lever 72 are mounted on shaft 71. Lever 72 is connected to lever 73 on shaft 24 by a spring or other lost motion means 74. When valve 22 is closed bias spring 70 holds valve 26 open. When knob 50 is moved to rotate shaft 24 to open valve 22, lever 73 rotates counter-clockwise and exerts a force on lever 72 through spring 74. In this manner valve 26 is closed against the action of bias spring 70 when knob 50 is moved to open valve 22.

Hot coolant from the normal engine cooling system may enter the radiator matrix 11 through an adjustable liquid flow control, valve 27, leaving by a pipe 39. Valve 27 is operated by a rotary control member. Two integral portions of this member are each indicated by the reference numeral 28 in FIGURE 1.

Shafts 16, 23, 24 and 36 have, mounted on their ends lying outside housing 1, cranks indicated at 29, 30, 31 and 37 respectively.

Crank 29 is connected via a link 32 to control member 28. This latter is connected via a further link 33 to a striker 34, capable of engaging with a pin 38 on crank 37. The position of member 28, and hence of valves 15 and 35, is controlled by means of a Bowden cable 40 connected to a control knob 41 (see FIGURE 4) movable along a slot in a suitably marked plate 42, mounted in use adjacent to the vehicle dashboard.

Cranks 30, 31 are respectively connected, through links 43, 44, to pivotally-mounted arms 45, 46. These arms respectively carry pins 47, 48 which engage with the periphery of a cam 49, the pins being held in engagement by a spiral spring 55. Cam 49 is carried upon a shaft 54, whose other end carries a crank 56 (FIGURE 3) actuated by means of a further Bowden cable 69, connected to a further control knob 50 (FIGURE 4) movable along a further slot in plate 42. The crank on shaft 54 is connected, through a link 57 to a further pivoted striker 58 (similar to striker 34) capable of engaging with a further pin 59 carried by a further crank 60 mounted at the other end of shaft 36 from crank 37. A coiled spring 61 engages crank 60 tending to rotate it so as to open valve 35.

One of knobs 41, 50 conveniently carries a push-pull type on-off switch for fan 8.

The manner of operation of the device will now be described.

When knobs 41, 50 are at the left hand ends of their respective slots all the valves are closed, and no air reaches the car interior through the device, and valve 15 closes port 14.

As knob 41 is moved from the left hand end of its slot, striker 34 releases pin 38, opening valve 35. A supply of cold air can then reach the car interior directly through port 13 and passage 65, by-passing radiator matrix 11. As knob 41 is moved further to the right, valve 27 opens, allowing water to flow through the radiator matrix 11, and thereafter valve 15 moves towards and, with knob 41 at the right hand end of its slot, reaches a position in which it closes port 13, so that then the entire flow of air passes through the radiator 11. Member 28, crank 29, and link 32 are so disposed that in the initial stages of movement of knob 41 from the left hand end of the slot, valve 27 opens almost completely before appreciable flow can occur past valve 15. Thus, as knob 41 is moved to the right beyond the point at which valve 35 is allowed to open, a flow of air more or less constant in volume but of gradually increasing temperature is fed to the main passenger compartment of the vehicle.

As knob 50 is moved from the left hand end of its slot, initially valve 21 moves to its fully open position, valve 22 remaining closed (demist position). Thereafter as the knob is moved to the right hand end valves 22 and 21 are operated conjointly, valve 22 being opened and valve 21 being closed, thus varying the proportion of air fed from compartments 4 and 12 to the windshield but the total flow remaining substantially constant, until valve 22 is fully open and valve 21 fully closed (defrost position). Thereafter, at the right hand limit of travel of knob 50, striker 58 is caused to engage pin 59 and so close valve 35. This prevents flow of air to the car interior, and gives a maximum flow of air to the windshield interior for demisting or defrosting according to the position of valve 15.

In any position of the knobs 41, 50 an increased flow of air may be obtained by starting the fan 8.

While there have been described above what are presently believed to be the preferred forms of the invention, variations thereof will be obvious to those skilled in the art and all such changes and variations which fall within the spirit of the invention are intended to be covered by the generic terms in the appended claims, which are variably worded to that end.

We claim:

1. Heating and ventilating apparatus for a vehicle having a passenger compartment and a windshield, the said apparatus comprising a housing, an inlet compartment within the housing adapted to be supplied with air from outside the vehicle, a main outlet compartment within the housing adapted to supply air to the passenger compartment, air heating means within the housing, a direct connecting by-pass passageway, the main outlet compartment communicating directly through said by-pass passageway with the inlet compartment and also through the heating means, and auxiliary outlet compartment adapted to supply air to the windshield and communicating directly both with the inlet compartment and with the main outlet compartment, first valve means controlling the proportions of air respectively flowing from the inlet compartment to the main outlet compartment directly and through the air heating means, a second valve controlling flow of air from the inlet compartment to the auxiliary outlet compartment, a third valve controlling flow of air from the main outlet compartment to the auxiliary outlet compartment, a cam rotatable about an axis, first and second cam followers cooperating with the cam and linked respectively to the second and third valves, manual control means controlling the position of the cam about the axis, the profile of the cam being such that over a substantial range of movement opening of one valve occurs simultaneously with the closing of the other, a fourth valve controlling flow of air from the main outlet compartment to the passenger compartment of the vehicle the fourth valve being spring restrained into an open position, a lost motion connection between the manual control means and the fourth valve such that the fourth valve is closed when the third valve is fully open whereby a maximum flow of heated air from the auxiliary outlet compartment to the windshield is obtained.

2. Heating and ventilating apparatus for a vehicle having a passenger compartment and a windshield, the said apparatus comprising a housing, an inlet compartment within the housing adapted to be supplied with air from outside the vehicle, a main outlet compartment within the housing adapted to supply air to the passenger compartment, air heating means within the housing, a direct connecting by-pass passageway, the main outlet compartment communicating directly through said by-pass passageway with the inlet compartment and also through the heating means, an auxiliary outlet compartment adapted to supply air to the windshield and communicating directly both with the inlet compartment and with the main outlet compartment, first valve means controlling the proportions of air respectively flowing from the inlet compartment to the main outlet compartment directly and through the air heating means, a second valve controlling flow of air from the inlet compartment to the auxiliary outlet compartment, a third valve controlling flow of air from the main outlet compartment to the auxiliary outlet compartment, a fourth valve controlling flow of air from the main outlet compartment to the passenger compartment of the vehicle, and control means for the second, third and fourth valves, the control means having a range of movement and controlling the second and third valves so that over a substantial portion of said range opening of one valve occurs simultaneously with the closure of the other, and also controlling the fourth valve so that it is closed when the third valve is fully open whereby a maximum flow of heated air from the auxiliary outlet compartment to the windshield is obtained.

3. Heating and ventilating apparatus for a vehicle having a passenger compartment and a windshield, the said apparatus comprising a housing, an inlet compartment within the housing adapted to be supplied with air from outside the vehicle, a main outlet compartment within the housing adapted to supply air to the passenger compartment, air heating means within the housing, a direct connecting by-pass passageway, the main outlet compartment communicating directly through said by-pass passageway with the inlet compartment and also through the heating means, an auxiliary outlet compartment adapted to supply air to the windshield and communicating directly both with the inlet compartment and with the main outlet compartment, first valve means controlling the proportions of air respectively flowing from the inlet compartment to the main outlet compartment directly and through the air heating means, a second valve controlling flow of air from the inlet compartment to the auxiliary outlet compartment, a third valve controlling flow of air from the main outlet compartment to the auxiliary outlet compartment, and control means for the second and third valves, the control means having a range of movement and controlling the second and third valves so that over a substantial portion of said range opening of one valve occurs simultaneously with the closure of the other.

4. Heating and ventilating apparatus for a vehicle having a passenger compartment and a windshield, the said apparatus comprising a housing, an inlet compartment within the housing adapted to be supplied with air from outside the vehicle, a main outlet compartment within the housing adapted to supply air to the passenger compartment, air heating means within the housing, a direct connecting by-pass passageway, the main outlet compartment communicating directly through said by-pass passageway with the inlet compartment and also through the heating means, an auxiliary outlet compartment adapted to supply air to the windshield and communicating directly both with the inlet compartment and with the main outlet compartment, first valve means controlling the proportions of air respectively flowing from the inlet compartment to the main outlet compartment directly and through the air heating means, and second valve means controlling the proportions of air flowing to the auxiliary outlet compartment from the inlet compartment and from the main outlet compartment respectively.

5. Heating and ventilating apparatus for a vehicle having a passenger compartment and a windshield, the said apparatus comprising a housing, an inlet compartment within the housing adapted to be supplied with air from outside the vehicle, a main outlet compartment within the housing adapted to supply air to the passenger compartment, air heating means within the housing, a direct connecting by-pass passageway, the main outlet compartment communicating directly through said by-pass passageway with the inlet compartment and also through the heating means, an auxiliary outlet compartment adapted to supply air to the windshield and communicating directly both with the inlet compartment and with the main outlet compartment, first valve means controlling the proportions of air respectively flowing from the inlet compartment to the main outlet compartment directly and through the air heating means, second valve means controlling the proportions of air flowing to the auxiliary outlet compartment from the inlet compartment and from the main outlet compartment respectively, the air heating means comprising a radiator matrix adapted to be fed with hot liquid and comprising also a liquid valve controlling flow of liquid through the radiator matrix and means to operate the liquid valve, the means being linked to the first valve means so that when flow of air over the matrix is prevented by the first valve means then flow of liquid through the matrix is also prevented.

6. Heating and ventilating apparatus for a vehicle having a passenger compartment and a windshield, the said apparatus comprising a housing, an inlet compartment within the housing adapted to be supplied with air from outside the vehicle, a main outlet compartment within the housing adapted to supply air to the passenger compartment, air heating means within the housing, a direct connecting by-pass passageway, the main outlet compartment communicating directly through said by-pass passageway with the inlet compartment and also through the heating means, an auxiliary outlet compartment adapted to supply air to the windshield and communicating directly with the inlet compartment and also through the heating means, first valve means controlling the proportions of air respectively flowing from the inlet compartment to the main outlet compartment directly and through the air heating means, second valve means controlling the proportions of air flowing to the auxiliary outlet compartment from the inlet compartment and from the main outlet compartment respectively, first and second ducts communicating with the inlet compartment and adapted to be fed with air from inside the vehicle, the first duct having a motor driven fan to assist flow of air into the inlet compartment and the second duct having a non-return valve to prevent loss of air from the inlet compartment through the second duct when the fan is driven.

References Cited in the file of this patent
UNITED STATES PATENTS

| | | |
|---|---|---|
| 2,257,967 | Le Feure et al. | Oct. 7, 1941 |
| 2,264,848 | Kahl | Dec. 2, 1941 |
| 2,634,670 | Simons | Apr. 14, 1953 |
| 2,800,068 | Arnold et al. | July 23, 1957 |
| 2,814,448 | Schutt | Nov. 26, 1957 |
| 2,860,567 | Wilfert | Nov. 18, 1958 |

UNITED STATES PATENT OFFICE
CERTIFICATE OF CORRECTION

Patent No. 3,072,339　　　　　　　　　　　　　January 8, 1963

Alan Salisbury Lamburn et al.

It is hereby certified that error appears in the above numbered patent requiring correction and that the said Letters Patent should read as corrected below.

In the heading to the printed specification, between lines 6 and 7, insert -- Claims priority, application Great Britain Sept. 5, 1957 --.

Signed and sealed this 1st day of October 1963.

(SEAL)
Attest:

ERNEST W. SWIDER
Attesting Officer

DAVID L. LADD
Commissioner of Patents